G. A. MINETTY.
LOCKING DEVICE.
APPLICATION FILED NOV. 21, 1911.

1,038,412.

Patented Sept. 10, 1912.

Witnesses:

Inventor:
George A. Minetty.
By Banning & Banning
Attorneys.

UNITED STATES PATENT OFFICE.

GEORGE ALLEXANDER MINETTY, OF DAVENPORT, IOWA.

LOCKING DEVICE.

1,038,412.  Specification of Letters Patent.  Patented Sept. 10, 1912.

Original application filed April 25, 1911, Serial No. 623,204. Divided and this application filed November 21, 1911. Serial No. 661,620.

*To all whom it may concern:*

Be it known that I, GEORGE A. MINETTY, a citizen of the United States, residing at Davenport, in the county of Scott and State of Iowa, have invented certain new and useful Improvements in Locking Devices, of which the following is a specification.

This invention relates to locking mechanism which is gravity operated and which is adapted to prevent movement of members in a given direction.

The principal objects of the present invention are to provide a simple inexpensive lock which shall be devoid of complication; to arrange the parts thereof in such manner that but a slight movement of one member will break the locking combination; and to utilize only the simplest means, such as the action of gravity, for returning the parts thereof to locking position and maintaining them in the same.

The invention further consists in the features of construction and combination of parts hereinafter described and claimed.

Figure 1:
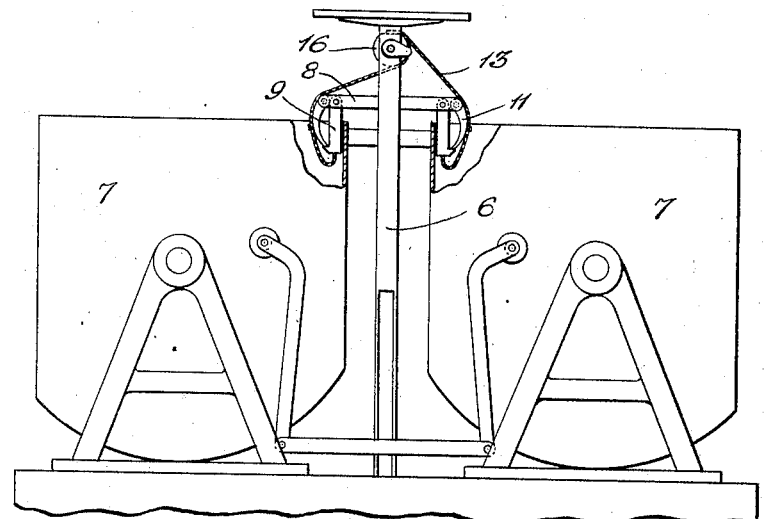
Figures 2, 3:
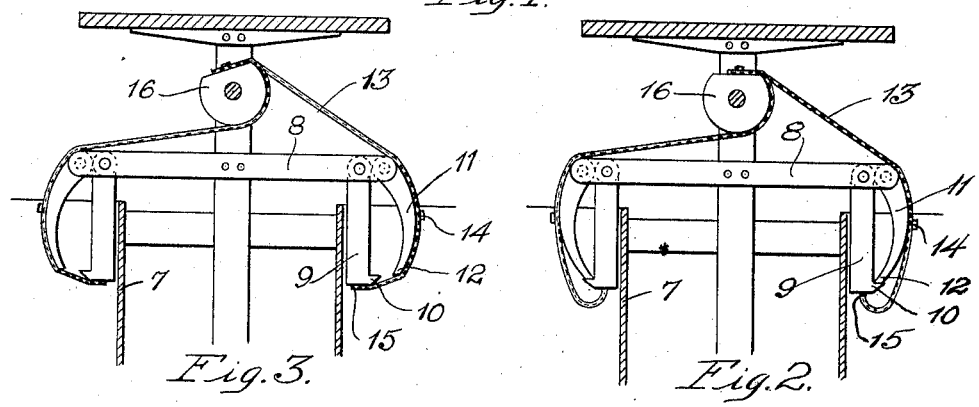
Figure 4:
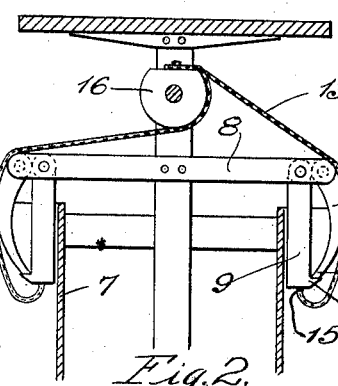
Figure 5:
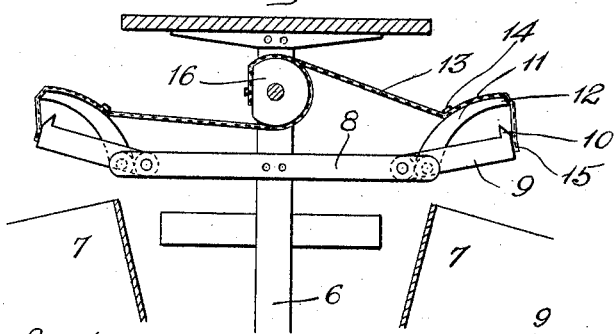

In the drawings, Figure 1 is an end view of a dumping car upon which my locking mechanism is applied to prevent outward oscillation of the hoppers; Fig. 2 is an enlarged view of said mechanism in its normal position; Fig. 3 is a view similar to Fig. 2 showing the mechanism at the commencement of its unlocking movement; Fig. 4 is a similar view showing said mechanism operated entirely out of locking position; and Fig. 5 is a plan view of said mechanism.

In the present invention, there is illustrated a novel locking mechanism which may be used in connection with a great variety of devices. For the purpose of a clearer explanation, the figures of the drawing represent its use in connection with a dumping car having outwardly oscillatable hoppers; an explanation of the operation of such hoppers is not here deemed necessary since the same is fully disclosed in my application for dumping cars, Serial No. 623,204, filed April 25, 1911, which resulted in Patent No. 1,013,801, dated January 2, 1912, of which patent the present case is a divisional application. The use of my invention is not, therefore, to be regarded as limited to this purpose alone, since I am aware that it is suited to the requirements of many other mechanical devices, and may be advantageously utilized therewith.

The operation of the parts of the present invention depends upon the principle that the position of the legs of a triangle when pivotally joined cannot be relatively changed; and that when one such pivotal connection is severed, the triangle legs are free to be swung as desired. It is according as this triangle of forces is preserved or broken that the device of the present invention assumes a locking or unlocking position.

As illustrated in the drawing, there is shown a supporting member 6 located adjacent the outwardly oscillating hoppers 7, to which member the locking device of the present invention is secured. This lock comprises a supporting arm 8 from which depends a pivotally mounted lock bar 9 provided near its free end with a shoulder 10; a dog 11 similarly mounted on the arm 8 capable of swinging movement in substantially the same plane as the bar 9 and adapted normally to bear its acting end 12 against the shoulder of the locking bar; and suitable means 13, such as the chain illustrated, for causing the dog to be swung away from its normal position.

On account of the triangular distribution of forces which exists when the parts of the lock are in normal locking position, the locking bar is prevented from swinging in the direction of the dog, and it is only after the dog has been withdrawn from engagement therewith that the bar can be swung to its unlocking position. The chain 13 which forms a suitable means for swinging the dog out of such engaging position may be secured thereto as at 14 and to the locking bar as at 15, the other end of said chain being connected with a drum 16 over which it may be wound when desired. The length of the chain between the points of fastening 14 and 15 should be sufficient to permit of the withdrawal of the dog from engagement with the shoulder 10 before it is drawn taut to move the locking bar. Obviously, other forms of connection between the dog and locking bar might be employed to attain the same result, as, for instance, the use of a loosely connected link, so it is not my desire to be limited to the use of a chain which is connected solely in the manner described.

When it is desired to unlock the parts of the device claimed in this invention, the dog is first withdrawn from engagement with the locking bar; this movement then permits the said bar to swing away out of its locking position to permit movement of a body thereby. The position of the parts will be much as is shown in Fig. 4, clearance being provided for the movement of said body. When the mechanism is allowed to return to its normal position, the dog and locking bar will swing by gravity into proper locking relations, as is indicated in Fig. 2.

From the foregoing description, it must not be inferred that the locking device of the present invention is limited in use to prevent movement of a body in a horizontal plane only. The positions of the locking members may be shifted to serve as a lock against perpendicular movement without altering their relations. In any case the dog can be made to bear its acting end against the shoulder of the locking bar through the action of gravity alone, and the return of the parts to their normal locking position will be accomplished automatically by the same agency.

The dog used in my device is shown as bow-shaped. This form is not essential to the successful operation of the lock; I have so illustrated it to show one construction by which the dog tends by gravity to swing inwardly against the shoulder. Obviously, any other construction by which the center of gravity is placed to the outside of the dog, whereby its acting end is brought into engagement with said shoulder will operate in the same manner.

I claim:

1. A locking device comprising a supporting frame, a pivotally swinging locking bar mounted thereon and provided with a shoulder at its free end, a dog pivotally mounted to said frame and adapted to bear its acting end in engagement with said shoulder, the position of the pivotal points of said dog and said bar with respect to the point of engagement at the free ends thereof constituting in effect the points of a triangle, a loose connection between said dog and said locking bar, and means for disengaging said dog from said locking bar, whereby the latter is unlocked, said means also serving to withdraw said bar from locking position, substantially as described.

2. A locking device comprising a support and two members swingingly secured thereto, having different pivotal centers, and having their free ends in engagement with one another, and means for withdrawing the free ends of said members from engaging position with one another, said means serving also to withdraw said members from locking position, substantially as described.

3. A locking device comprising a support and two members swingingly secured thereto, having different pivotal centers, and having their free ends in engagement with one another, a loose connection between said members, and means for withdrawing the free ends of said members from engaging position with one another, said means serving also to withdraw said members from locking position, substantially as described.

4. A locking device comprising a support, a pivotally swinging locking bar mounted thereon, and provided with a shoulder at its free end, a dog pivotally mounted to said frame and adapted to bear its acting end in engagement with said shoulder, the position of the pivotal points of said dog and said bar with respect to the point of engagement at the free ends thereof constituting in effect the points of a triangle, and means for disengaging said dog from said locking bar, whereby the latter is unlocked, said means serving also to withdraw said bar from locking position, substantially as described.

5. A locking device comprising a support and two members swingingly secured thereto, having their free ends in engagement with one another, the position of the pivotal points of said members with respect to the point of engagement at the free ends thereof constituting in effect the points of a triangle, and means for disengaging the free ends of said members, said means serving also to withdraw said members from locking position, substantially as described.

GEORGE ALLEXANDER MINETTY.

Witnesses:
L. CORSIGLIA,
J. CORSIGLIA.